Patented Mar. 15, 1932

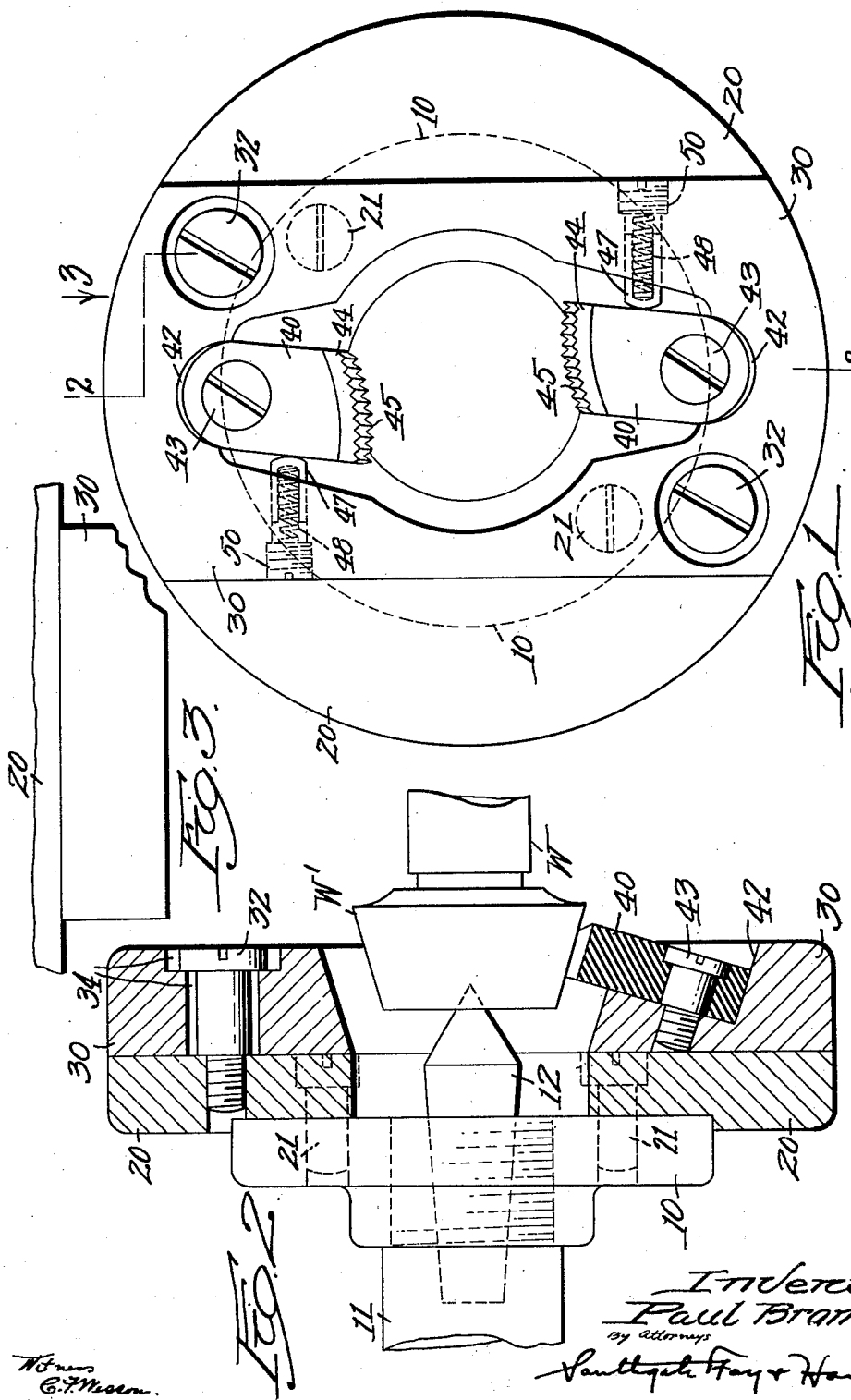

1,849,539

UNITED STATES PATENT OFFICE

PAUL BRANIGAN, OF SENECA FALLS, NEW YORK, ASSIGNOR TO SENECA FALLS MACHINE COMPANY, OF SENECA FALLS, NEW YORK, A CORPORATION OF MASSACHUSETTS

WORK-DRIVING DEVICE

Application filed August 22, 1929. Serial No. 387,769.

This invention relates to a device for engaging and driving the work in a lathe, grinder or other machine tool.

A prior patent to Ashton No. 1,632,018, issued June 14, 1927, shows a work-driving device which is well adapted for the driving of cylindrical work.

My present invention relates to certain improvements in this general type of driving device, as a result of which equally satisfactory results may be attained in driving tapered or conical work, such as the bevel pinion and shaft blank herein shown.

My invention further relates to arrangements and combinations of parts which will be hereinafter described and more particularly pointed out in the appended claims.

A preferred form of the invention is shown in the drawings in which

Fig. 1 is a front elevation of my improved work-driving device;

Fig. 2 is a sectional side elevation thereof, taken along the line 2—2 in Fig. 1; and Fig. 3 is a detail plan view, looking in the direction of the arrow 3 in Fig. 1.

Referring to the drawings, I have shown a flange 10 adapted to be threaded on the end of a work spindle 11 in a lathe, grinder or other machine tool.

A head center 12 is mounted in the end of the spindle 11 and extends into a center hole in the adjacent end of the work W. The work is shown as having an enlarged conical end portion W′ with which the work driving devices engage. This end portion W′ may be a bevel pinion and shaft blank as shown or any other work of similar outline.

A disc 20 is centered on the flange 10 and may be secured thereto by clamping screws 21. A supporting member 30 is loosely secured on the face of the disc 20 by studs or screws 32 which extend through the member 30 and are threaded in the disc 20. The screws 32 are provided with enlarged heads and the screws and heads are received in openings 34 in the member 30 which are of such diameter as to permit a limited sliding movement of the member 30 relative to the disc 20.

Dogs 40 are mounted in angularly disposed recesses 42 in the member 30 and are pivotally secured therein by studs 43 threaded into the member 30. The dogs 40 are disposed at such an angle that they are substantially perpendicular to the beveled or conical face of the enlarged end W′ of the work W.

The dogs 40 are provided with eccentric or cam-like faces 44 which are preferably provided with teeth 45 by which the work is firmly engaged. Spring plungers 47 are mounted to slide in openings in the member 30 and are forced into yielding engagement with the sides of the dogs 40 by springs 48, compressed within the plungers 47 by screws 50.

Having described the details of construction of my improved work-driving device, the operation and advantages thereof will be apparent. When a conical piece of work is mounted on the head center 12, the jaws 40 will be swung against the work by the spring plungers 47 and the teeth 45 of the cam-like faces 44 will firmly engage the work and positively rotate the same. The mounting of the dogs 40 at an angle substantially perpendicular to the conical face of the work permits the jaws to engage the work as effectively as was previously the case with cylindrical work.

As the jaws engage the work, the member 30 floats to a position to equalize the pressure on the opposite sides of the work.

Efforts have been made to drive tapered or conical work by simply providing beveled faces on the previously used dogs, but in commercial use this construction was found unreliable and unsatisfactory, whereas the device shown and described herein has proved to be eminently satisfactory under actual working conditions.

Having thus described my invention and the advantages thereof, I do not wish to be limited to the details herein disclosed, otherwise than as set forth in the claims, but what I claim is:—

1. In a machine tool, a driving device for conical work comprising a rotatable supporting member and a pair of dogs each pivotally mounted to swing on said rotatable member in a plane oblique to the axis of rotation of said rotatable member, each dog having a work-engaging cam face with its work-engaging elements substantially perpendicular to its plane of swinging movement, said dogs being mounted in spaced recesses in said rotatable member and their pivotal axes being each substantially parallel to a longitudinal straight line element of a conical work-piece engaged thereby.

2. In a machine tool, a driving device for conical work comprising a rotatable supporting member and a pair of dogs each pivotally mounted to swing on said member on axes oblique with respect to the axis of rotation of said rotatable member and each dog having a work-engaging cam face with its work-engaging elements substantially perpendicular to its plane of swinging movement and substantially parallel to a longitudinal straight line element of a conical work-piece engaged thereby.

3. The combination in a machine tool as set forth in claim 2, in which spring plungers are mounted in said supporting member and yieldingly engage said dogs to force the dogs toward the work.

4. The combination in a machine tool as set forth in claim 2, in which said supporting member is mounted for movement transversely of its axis of rotation to center the dogs on the work.

5. In a machine tool, a rotatable supporting disc, a member mounted for limited transverse movement on said disc and having recesses in its outer face obliquely disposed with respect to the axis of rotation of said member, and a pair of dogs pivoted in said recesses on axes obliquely disposed with respect to the axis of rotation of said disc, said dogs having work-engaging cam faces which are substantially parallel to the pivotal axis thereof and to the surface of tapered or conical work engaged and rotated thereby.

In testimony whereof I have hereunto affixed my signature.

PAUL BRANIGAN.